(12) United States Patent
Powell

(10) Patent No.: US 7,171,880 B2
(45) Date of Patent: Feb. 6, 2007

(54) DUST COLLECTION FOR PANEL SAW

(76) Inventor: Michael S. Powell, 2200 NW. Corp. Blvd., Suite 220, Boca Raton, FL (US) 33431

( * ) Notice: Subject to any disclaimer, the term of this patent is extended or adjusted under 35 U.S.C. 154(b) by 0 days.

(21) Appl. No.: 10/993,689

(22) Filed: Nov. 19, 2004

(65) Prior Publication Data

US 2006/0107809 A1    May 25, 2006

(51) Int. Cl.
*B26D 7/06* (2006.01)
(52) U.S. Cl. ............................................ 83/100; 83/485
(58) Field of Classification Search .................. 83/100, 83/471.2, 101, 471.3, 477.1, 488, 104, 471; 144/252.1; 29/DIG. 86, DIG. 84, DIG. 44, 29/DIG. 79; 451/456, 453; 269/246, 95
See application file for complete search history.

(56) References Cited

U.S. PATENT DOCUMENTS

| | | | | | |
|---|---|---|---|---|---|
| 3,837,383 | A | * | 9/1974 | Ko | .............. 144/251.2 |
| 3,958,474 | A | * | 5/1976 | Kreitz | .................. 83/100 |
| 4,150,597 | A | | 4/1979 | Striebig | |
| 4,181,054 | A | | 1/1980 | Striebig | |
| 4,183,272 | A | | 1/1980 | Striebig | |
| 4,202,231 | A | | 5/1980 | Striebig | |
| 4,253,362 | A | * | 3/1981 | Olson | .................. 83/100 |
| 4,255,995 | A | * | 3/1981 | Connor | ................ 83/100 |
| 4,631,999 | A | | 12/1986 | Striebig | |
| 4,638,695 | A | | 1/1987 | Striebig | |
| 4,802,392 | A | | 2/1989 | Striebig | |
| 5,494,251 | A | * | 2/1996 | Katz | ................ 248/449 |
| 6,058,819 | A | * | 5/2000 | Binder et al. | ........... 83/168 |
| 6,783,563 | B1 | * | 8/2004 | Eckhoff et al. | .......... 55/356 |

* cited by examiner

*Primary Examiner*—Kenneth E. Peterson
*Assistant Examiner*—Phong Nguyen
(74) *Attorney, Agent, or Firm*—Mark D. Bowen, Esq.; Stearns Weaver Miller Weissler Alhadeff & Sitterson, P.A.

(57) ABSTRACT

A sawdust collection cup of a dust collection system for use with a panel saw is disposed proximal a bottom of a vertically disposed channel member. The sawdust collection cup has an open top, a front portion disposed for receiving sawdust from in front of a workpiece, and a rear portion aligned with the channel member that functions as a catch basin for sawdust ejected into the channel member for receiving sawdust from the rear side of the workpiece. The sawdust collection cup further defines an outlet for connecting to a dust collection hose.

8 Claims, 7 Drawing Sheets

DUST COLLECTION FOR PANEL SAW

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to panel saws, and more particularly to improvements in panel saws that provide vastly improved dust collection.

2. Description of Related Art

A panel saw is a power saw apparatus specifically designed to cut relatively large and thin panels of material, such as plywood. Typical panel saws include a generally vertical angled frame having a front side adapted to receive and support a panel to be cut, and one or more tubular guides or tracks having rotary saw carriage in slidable engagement therewith so as to allow the saw to travel the length of the tracks while cutting the panel. Panel saws are common pieces of wood working equipment found in wood shops and mills, as well as in various retail outlets such as home improvement stores and hardware stores.

While the panel saw provide an efficient and proven power tool for cutting panels and sheets of plywood, there remain a number of problems and shortcomings associated with the operation thereof that heretofore have not been adequately solved or addressed. One such problem associated with certain panel saws relates to the substantial amount of sawdust created and dispersed when cutting. The sawdust generated by the rotating saw blade as it travels the length of the panel ranges from very fine dust particles to larger wood chips. While this problem has been widely recognized for many years, panel saw manufactures and others have failed to develop an effective dust collection system for use with these saws. One common, yet ineffective, solution has been to provide the saw blade with a protective guard or hood adapted with a suction port connected to a vacuum-generating dust collection system by a hose. By way of example, U.S. Pat. No. 4,631,999, issued to Striebig, discloses a panel saw wherein the rotary saw is carriage is adapted with a protective cover having an outlet connected to an exhaust pipe that serves to discharge the sawdust produced to a vacuum source. Such attempts, however, have proven unsatisfactory and generally ineffective.

As a result of the persistent problems associated with saw dust, the background art reveals a number of attempts directed to dust collection systems for use with panel saws. For example, U.S. Pat. No. 4,638,695, issued to Striebig, discloses a panel saw adapted with a complex sawdust exhaust duct arranged vertically slidably on the saw so that is follows the vertical movement of the sawing unit during horizontal cutting. The sawdust exhaust duct is a complex assembly formed by a U-shaped duct having an endless driven band disposed therein. A slot provided in the band allows sawdust generated by the cutting process to be thrown into the space enclosed by the band whereafter the sawdust is exhausted. U.S. Pat. No. 4,802,392, issued to Striebig discloses a panel saw adapted to collect sawdust using a rotatably mounted spindle with a sealing foil deployed therefrom so as to form horizontal flow channels to collect sawdust. Striebig's reliance, however, on complex spindles and slidable exhaust ducts has not gained widespread acceptance.

In addition, advances in the art of panel saw dust collection have not proven successful in substantially containing and collecting sawdust generated by the panel saw. Thus, there exists a need for improvements in panel saw design. More particularly, there exists a need for an improved dust collection system for use with panel saws.

BRIEF SUMMARY OF THE INVENTION

The present invention overcomes the disadvantages and shortcomings in the art by adapting a vertical cut panel saw to vastly improve dust collection efficiency and user safety. In accordance with the present invention a panel saw is adapted with an improved protective blade cover having an oversized duct connected to a vacuum-type dust collection apparatus by a hose. The blade cover duct has an angled end configured to deflect and direct sawdust and wood chips downstream into the dust collection hose. A device that functions as both a guide and pulley is mounted to the top of the panel saw frame to allow the dust collection vacuum hose to travel over the frame in trailing relation with the carriage carrying the rotary power saw. The rotary power saw carriage is further adapted with a skirt attached in surrounding relation with the projecting saw blade and projecting therefrom in sweeping contact that defines a sawdust containment volume between the workpiece to be cut and the underside of the rotary saw power carriage. The panel saw frame is further adapted with a generally U-shaped sawdust trough connected thereto and disposed in vertical aligned relation with the cutting channel defined by the panel saw frame so as to contain any sawdust projected behind the workpiece. A T-shaped fitting connected to the bottom of the vertically disposed sawdust trough and functions as a catch basin for sawdust ejected into the trough. The T-shaped fitting includes a rearwardly projecting leg adapted for connection to a dust collection vacuum hose thereby providing the panel saw with a second dust collection connection.

The present invention further provides a collapsible panel saw frame to provide a structure specifically adapted for use with a panel saw so as to substantially hide panel saw vacuum system while not inhibiting normal operation.

A further aspect of the present invention relates to providing a control system limiting use of a panel saw to authorized users for predetermined time periods.

Accordingly, it is an object of the present invention to provide an improved panel saw.

Another object of the present invention is to provide an improved dust collection system for use with panel saws.

Still another object of the present invention is to provide components for installation to a conventional panel saw to vastly improve sawdust containment and collection.

In accordance with these and other objects, which will become apparent hereinafter, the instant invention will now be described with particular reference to the accompanying drawings.

DETAILED DESCRIPTION OF THE INVENTION

Figure 1:
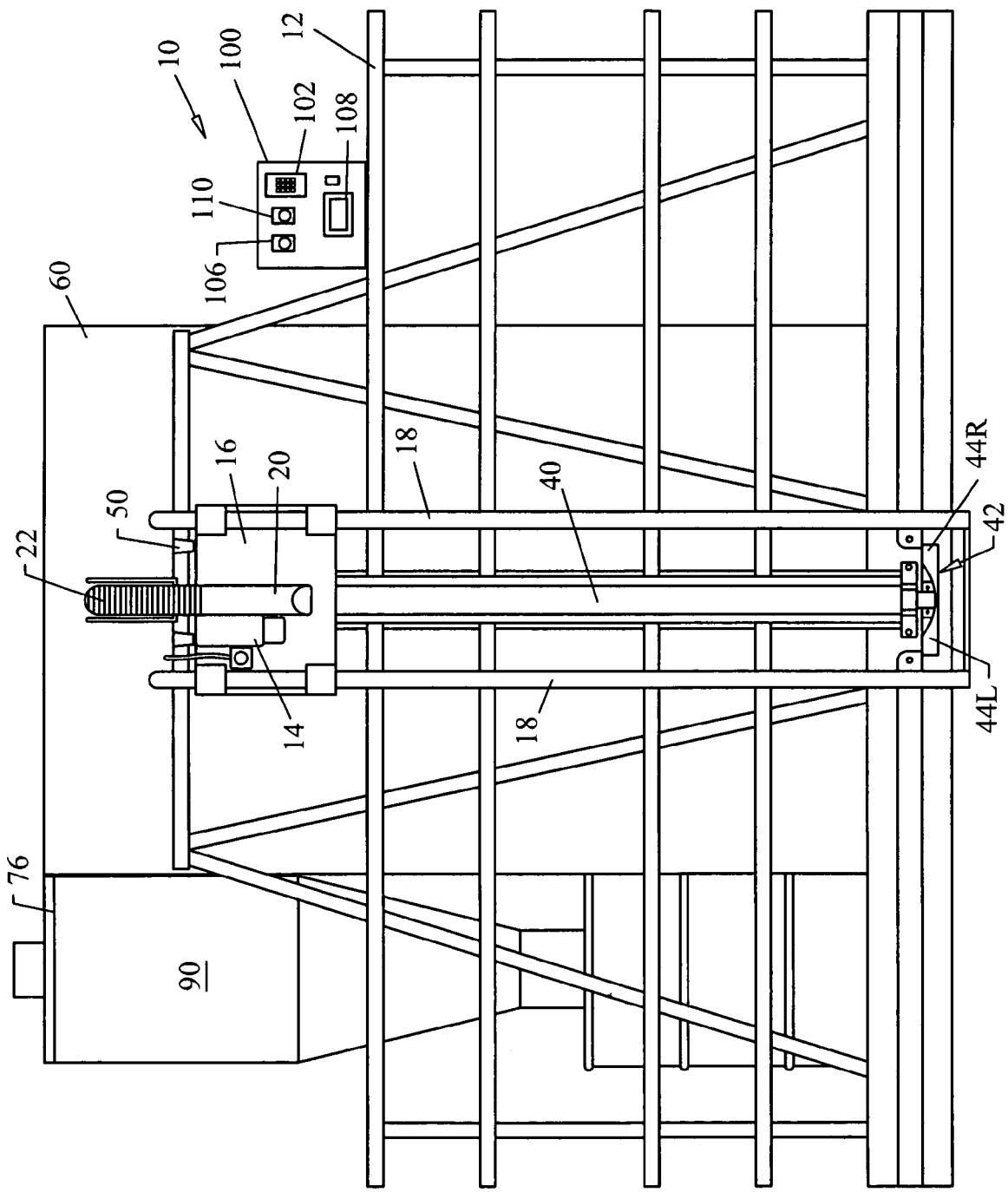
FIG. 1 is a front view of an improved panel saw according to the present invention.

With reference now to the drawings, FIGS. 1–7, depict a panel saw, generally referenced as 10, adapted for improved safety and dust collection in accordance with the present invention. Panel saw 10 includes a frame 12 disposed in a generally angled vertical configuration for providing a supporting structure for panels, such as plywood, to be cut. Frame 12 further includes a rotary power saw 14 mounted on a carriage 16 configured for vertical travel along a pair of laterally spaced tubular guides 18. Carriage 16 is typically provided with a pulley and counterweight to negate gravitational force, and in most models the force applied by the counterweight exceeds that of the saw carriage so as to bias the carriage to the uppermost configuration. Accordingly, panels supported by frame 12 are cut by the power saw as carriage 16 travels downward along guides 18 from the uppermost position depicted in FIG. 1. It is noted that each of the above-referenced structures are found in panel saws of the prior art.

The present invention provides improvements directed to improving dust collection capability. More particularly, in accordance with the present invention panel saw 10 is adapted with a saw blade protective shroud 20 configured for connection to a dust collection hose 22 in communication with a vacuum source. Protective shroud 20 includes a tubular top portion having a beveled first end 24 and a second end 26 defining a generally circular cross-section suitable for connection to a flexible hose in fluid communication with a dust collection vacuum system. Protective shroud 20 substantially covers the rotating blade of power saw 14. Beveled end 24 provides an angled inner surface which functions to deflect and direct sawdust and larger particles generated during the cutting process toward the second end 26 of protective shroud 20 and into dust collection hose 22. Protective shroud 20 thus provides improved dust collection capability over protective shrouds found in the background art.

Figure 4:
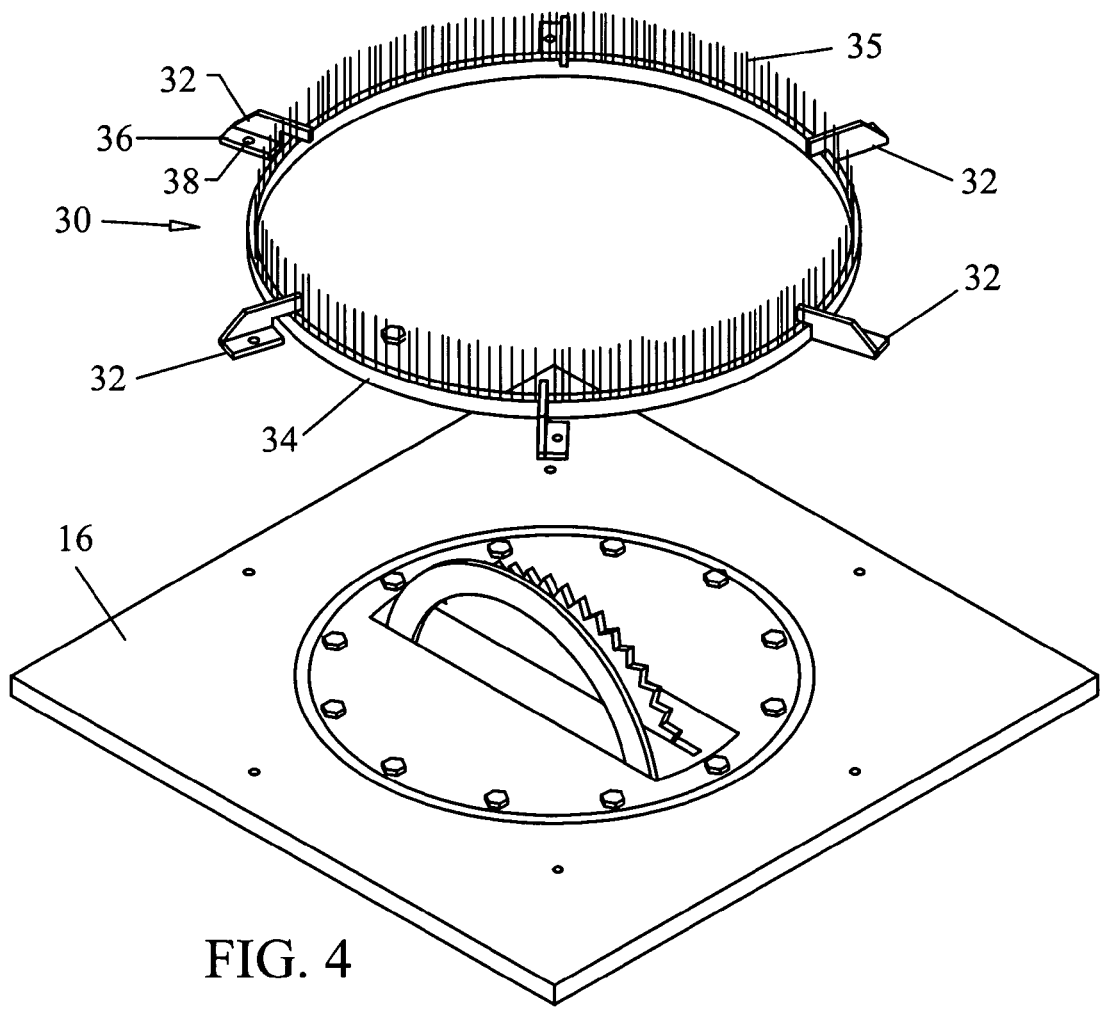
FIG. 4 is a partial rear exploded view of the saw carriage and sawdust containment ring.
Figure 5:
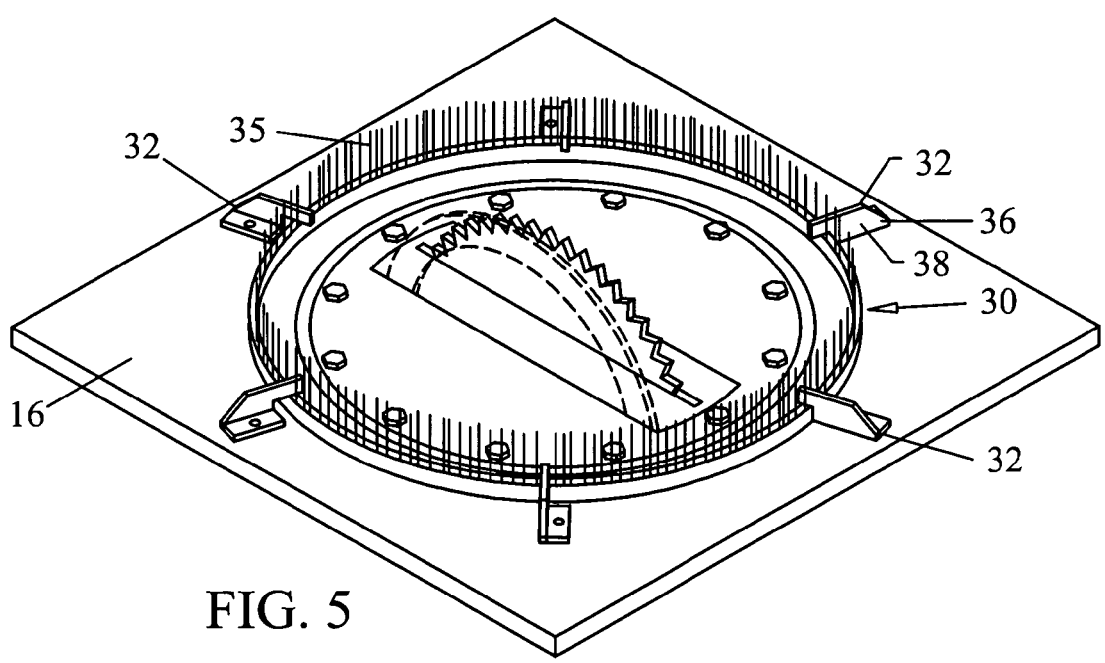
FIG. 5 is an assembled view thereof.

FIGS. 4 and 5 depict the rear side of power saw carriage 16 to reveal a containment skirt 30 for sawdust, wood chips, and other particles generated by the power saw while cutting. In a preferred embodiment the present invention contemplates attaching a containment skirt 30 to the underside of power saw carriage 16 in at least partial surrounding relation with the saw blade using a plurality of clips 32. Containment skirt 30 may include a mounting ring base 34 comprising a strip of flexible material having a plurality of bristles 35 projecting therefrom. Clips 32 each include a flange portion 36 defining an aperture 38 for receiving a suitable fastener for attaching the clips 32 to the underside of power saw carriage 16 as best depicted in FIGS. 4 and 5. Bristles 35 are selected so as to contact the panel being cut and move in sweeping engagement with the surface of the panel as the power saw carriage moves vertically while cutting thereby forming a containment volume. The containment volume is in fluid communication with a dust collection vacuum source via protective shroud 20 attached to the opposite side of power saw carriage 16 so as to draw saw dust and other particulate matter from the containment volume.

Figure 3:
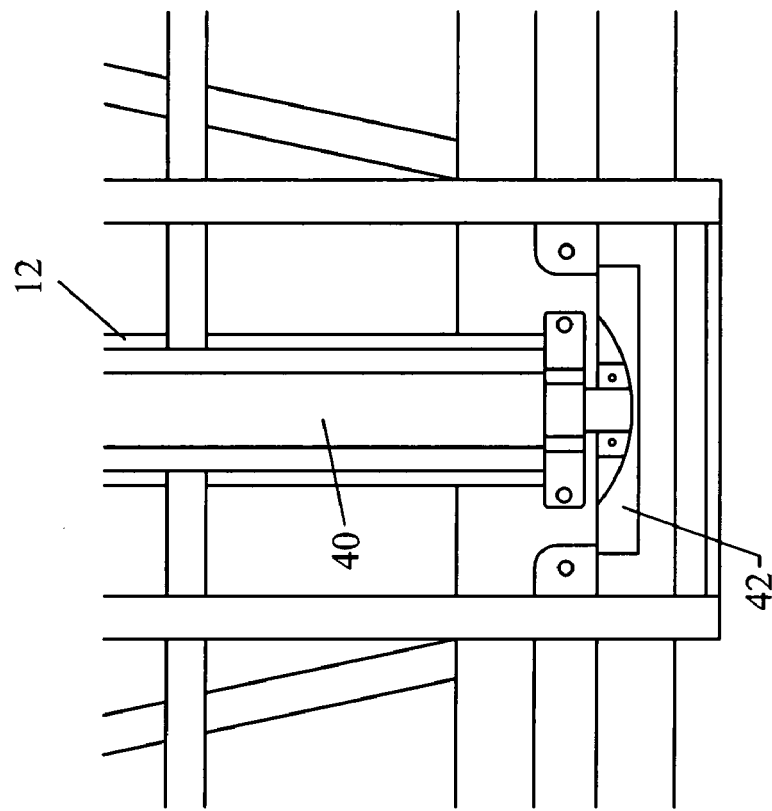
FIG. 3 is a front detail view of the lower saw carriage track assembly.
Figure 2:
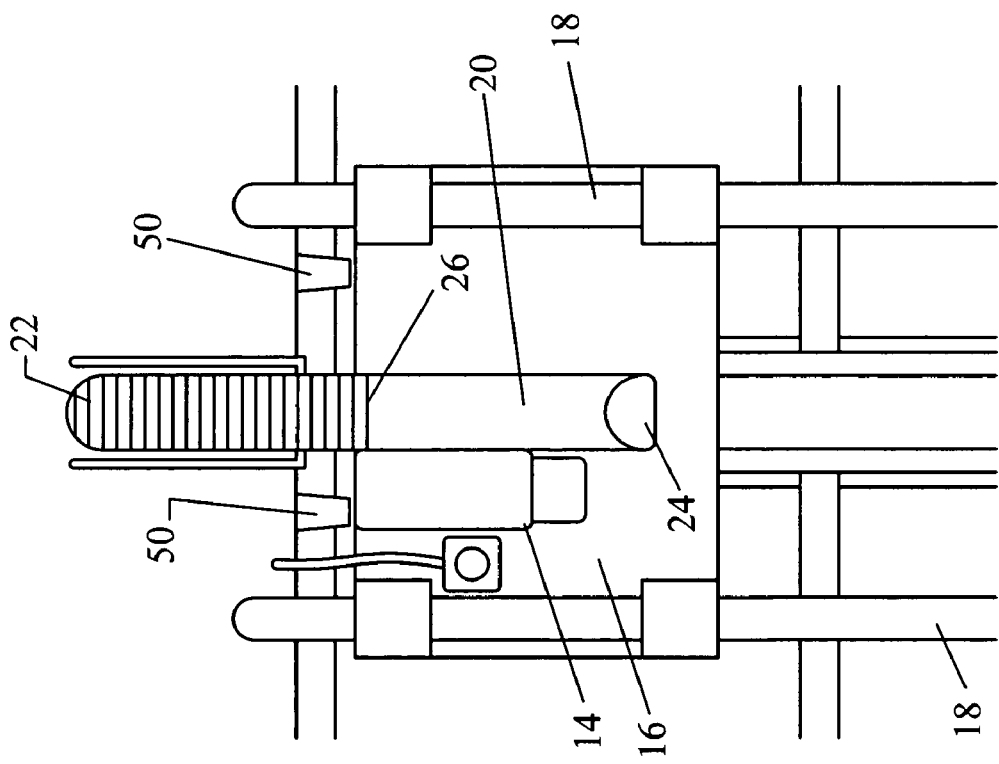
FIG. 2 is a front detail view of the upper saw carriage and track assembly.
Figure 6:
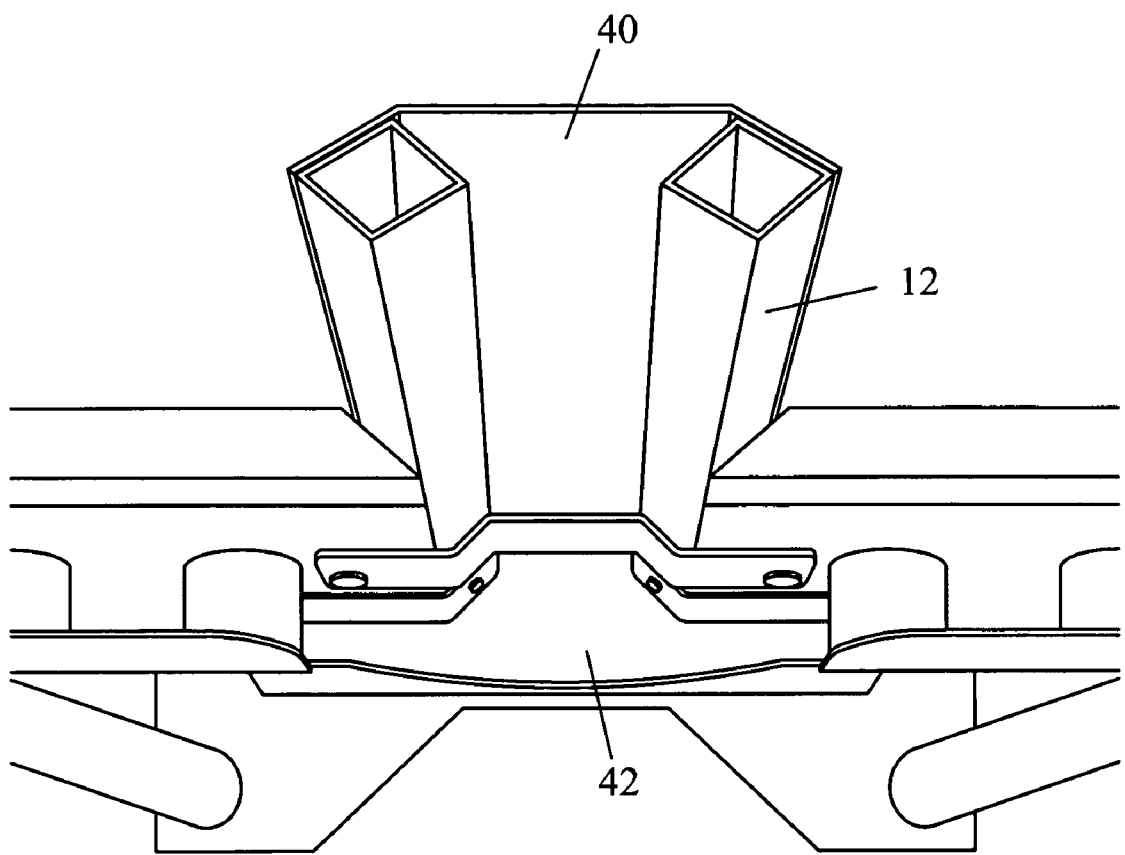
FIG. 6 is a top down perspective view of the lower carriage track and dust collection fitting.
Figure 7:
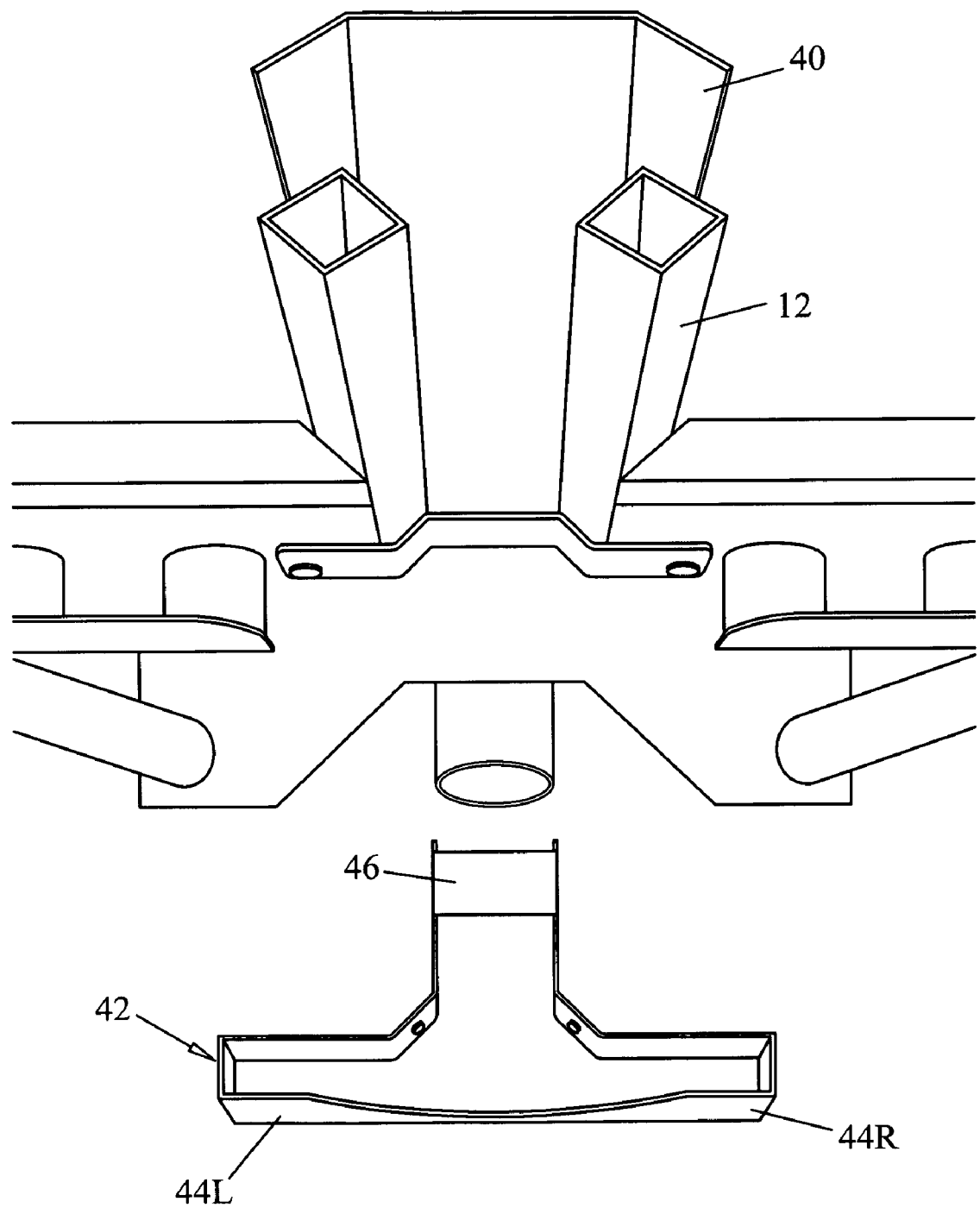
FIG. 7 is an exploded view thereof.

The present invention maximizes dust collection according to a further aspect that relates to collection of saw dust from the opposite side of the panel. As best depicted in FIGS. 3 and 6, the present invention further includes a generally U-shaped channel or trough 40 attached to vertical frame members 12 in substantial alignment with the cutting plane. Channel member 40 preferably extends from the top of frame 12 to the bottom portion thereof. Channel member 40 functions to catch saw dust and debris ejected behind the panel member during the cutting process and to funnel the particles downward to a sawdust collection cup 42. In a preferred embodiment, the sawdust collection cup comprises a generally T-shaped trough. As best depicted in FIGS. 6 and 7, T-shaped trough 42 includes a front portion with left and right laterally projecting arms 44L and 44R that function as catch basins for saw dust and debris. T-shaped trough 42 further includes a rearwardly projecting leg 46 adapted for connection to a dust collection hose behind frame 12 for drawing particulate matter falling within trough 42 into a dust collection system. As best depicted in FIG. 3, T-shaped trough 42 includes a front wall defining an arcuate cutout for providing clearance for the rotary saw blade when carriage 16 reaches its lowermost travel. Accordingly, saw dust and wood chips generated during the cutting process that are ejected behind the panel are captured by channel 40 and fall under the influence of gravity downward into T-shaped trough 42, wherein a vacuum hose connected to leg 46 draws the particles into the dust collection system. In addition, saw dust and particles captured within the containment volume on the front of the panel formed by the underside of carriage 16 and containment skirt 30 are allowed to pass into T-shaped trough 40 via the arcuate recessed front wall when carriage 16 reaches its lowermost travel. It should be noted, however, that any suitable collection cup having an open top and adapted for connection to a dust collection hose is considered within the scope of the present invention.

As noted above, carriage 16 is typically provided with a pulley and counterweight to negate gravitational force. In most panel saw models the force applied by the counterweight exceeds that of the saw carriage so as to bias the carriage to the uppermost configuration. Accordingly, one significant problem associated with prior art panel saws adapted with such counterweight mechanisms relates to the carriage impacting the top portion of the frame with excessive force upon returning to the uppermost position. The resulting impact is noisy and repeated impacts have been found to cause significant damage to the panel saw frame. Accordingly, a further aspect of the present invention involves adapting a panel saw with at least one bumper, referenced as 50, that functions as an uppermost stop for carriage 16. Bumper 50 may be mounted on either the frame so as to engage the rotary saw carriage, or on the rotary saw carriage so as to engage the frame, at the uppermost carriage travel limit.

Figures 8, 9:
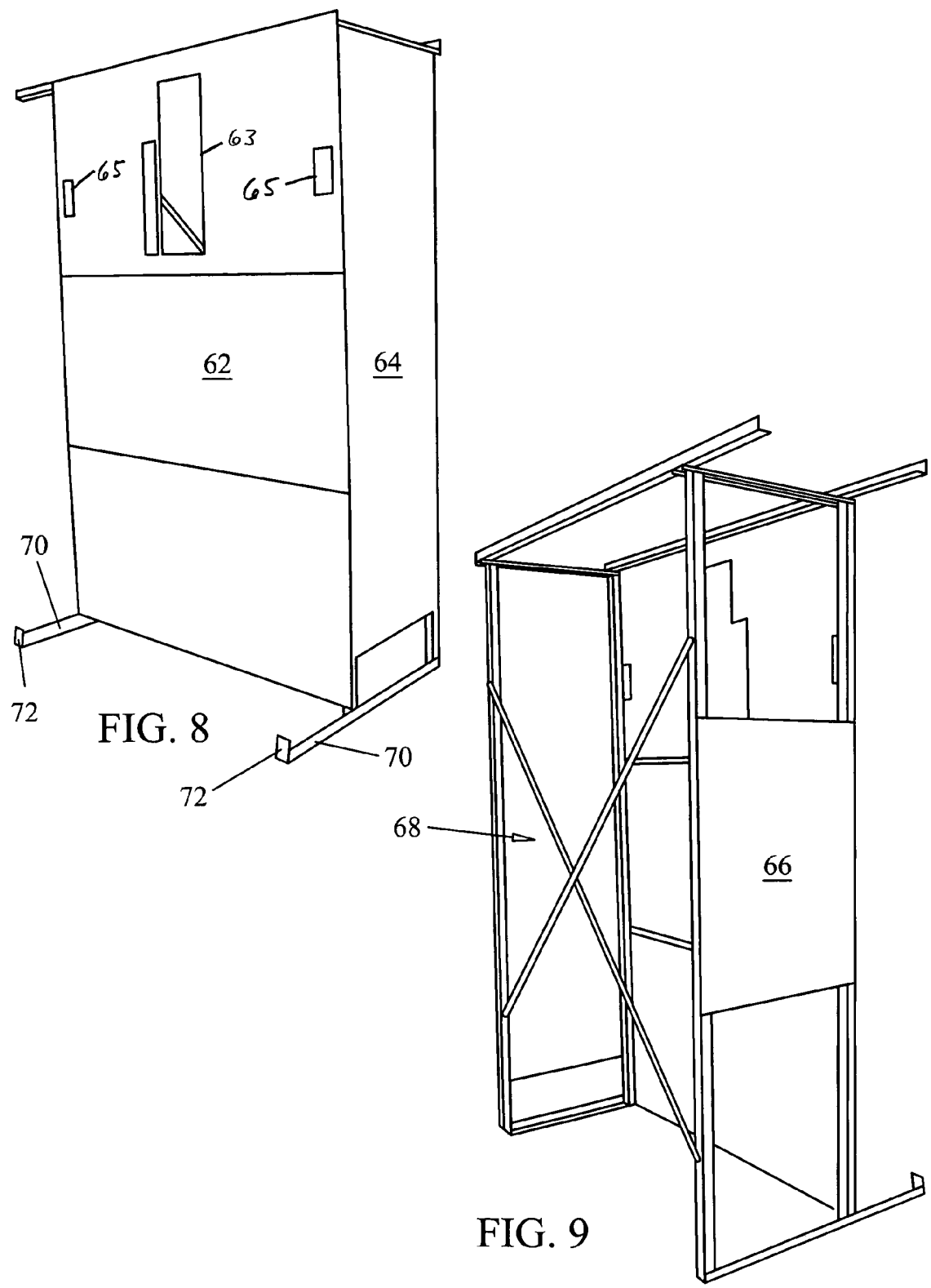
FIG. 8 is a front perspective view of a stand for use with a panel saw.
FIG. 9 is a rear perspective view thereof.
Figures 10, 11:
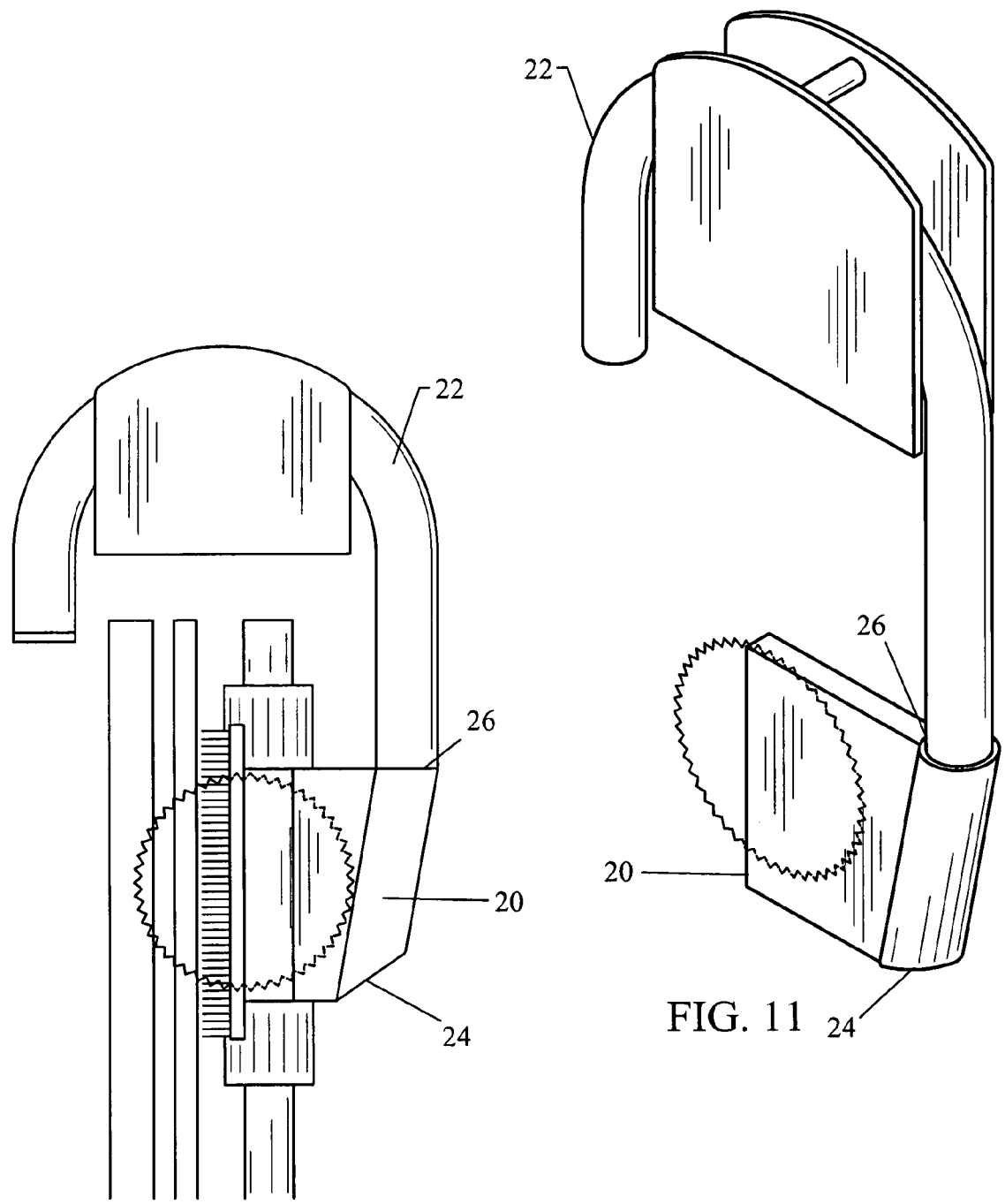
FIG 10 is a partial side view of the upper saw carriage and blade shroud assembly.
FIG. 11 is a partial perspective view illustrating the blade shroud in covering relation with the saw blade.

FIGS. 8 and 9 depict a stand, generally referenced as 60, for use with an panel saw in accordance with the present invention. FIG. 1 depicts stand 60 in operative relation with panel saw 10 mounted thereon. As best seen in FIGS. 8 and 9, stand 60 includes frame members and panels forming a front 62, opposing sides 64 and 66, and a generally open back portion 68. Stand 60 further includes a pair of laterally spaced forwardly projecting feet 70 terminating in upwardly turned end portions 72. Feet 70 function to provide a stable base for stand 60 while further providing a supporting structure for a panel saw positioned thereon. Stand 60 further includes a top portion having a pair of laterally projecting front and rear rigid members, referenced as 76, that function to support a dust collection housing (not shown).

As best seen in FIG. 1, in a typical installation, the panel saw assembly 10 rests on feet 70 at behind panel saw 10. Panel saw 10 is maintained at a rearwardly sloping angle relative to vertical by upwardly turned end portions 72, so as to allow panels placed thereon to sit in a stable rearward leaning configuration. Laterally projecting front and rear rigid members 76 provide cantilevered mounting structures for mounted attachment of a cyclonic/centrifugal dust collection system, generally referenced as 90. Stand 60, and particularly front panel 62 is adapted to conceal the area behind panel saw 10. Accordingly, front panel 62 defines at least one opening, referenced as 63, through which dust collection hose 22 is routed. In addition, front panel 62 defines a pair of openings, referenced as 65, through which angle brackets project for connection of panel saw 10 to stand 60.

The present invention may further include a control panel, referenced as 100 which functions to provide safe and efficient operation of the panel saw, particularly for saws operating in retail store environments, such as saws operating in home improvement and hardware stores, as shown in FIG. 1. Control panel 100 provides a primary connection to electrical power, such as 208 VAC, 230 VAC, or 460 VAC electrical power and includes a step-down electrical transformer capable of 24 VAC output. The ability of control panel 100 to operate using a range of voltages is considered important since the power available at different locations often varies. Control panel 100 includes a keypad 102 that provides an input device to restrict operation to authorized users who enter an appropriate authorization code. A power supply is connected to the 24 VAC output for providing DC power to keypad 102. Control panel 100 further includes a main disconnect switch that enables quick disconnection of power to the saw and various components. In addition, a push-start/pull-stop control button 106 is provided to initiate or discontinue operation. Further, control panel 100 includes a visual alarm beacon 108 that is configured to flash when power is supplied to the panel saw systems, and an alarm horn 110 that is configured to generate an audible sound after a predetermined time period to indicate that the panel saw is about to shut down.

The operating sequence for a panel saw adapted with a control panel according to the present invention is a follows.

A red indicator light on the keypad indicates that power is being supplied to the panel saw control panel. The user enters the appropriate security code on the keypad to initiate operation. As should be apparent, any suitable code may be used. Upon entry of the appropriate code, a light on control button 106 illuminates indicating that a predetermined operation period, such as five minutes, has begun. The user then must pull control button 106 to automatically supply power from the control panel to the panel saw and dust collection system, at which time beacon 108 is activated thus providing a visual signal/warning that power has been supplied and the systems are operational. Shortly before expiration of the predetermined operation period (e.g. 30 seconds prior to expiration) alarm horn 110 sounds as a signal that the saw will automatically shut down shortly. While the system is programmed to allow operation for a predetermined period of time before automatically shutting down, the period of operation may be extended by re-entering the authorization code. If, at any time, the operator wishes to manually shut the systems down he simply must push control button 106.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved dust collection system for use with a panel saw of the type having a generally vertically disposed frame and power saw with rotary blade mounted on a carriage movably attached to the frame for travel in a generally vertical direction to cut a workpiece, said workpiece having a front side facing away from the panel saw frame and a rear side facing toward the panel saw frame, said improved dust collection system comprising:

a skirt attached to the power saw carriage in at least partial surrounding relation with the projecting saw blade and projecting from the power saw carriage so as to be in sweeping contact with the panel workpiece thereby defining a sawdust containment volume between the workpiece and the underside of the rotary saw power carriage;

a channel member connected to the panel saw frame and disposed in vertical aligned relation with rotary saw blade for containing sawdust behind the workpiece;

a sawdust collection cup disposed proximal the bottom of said vertically disposed channel member, said sawdust collection cup having an open top, said sawdust collection cup including a front portion disposed for receiving sawdust from in front of the workpiece, and a rear portion aligned with said channel member that functions as a catch basin for sawdust ejected into said channel member for receiving sawdust from the rear side of said workpiece, said collection cup defining an outlet for connection to a dust collection hose.

2. An improved dust collection system for use with a panel saw according to claim 1, further including a blade shroud attached to said carriage in covering relation with the rotary power saw blade, said shroud having an angled top end configured to deflect and direct sawdust and wood chips into an outlet defined by said blade shroud; and a dust collection hose in communication with a vacuum dust collection system connected to said outlet.

3. An improved dust collection system for use with a panel saw according to claim 1, further including at least one bumper for cushioning contact between said rotary saw carriage and said panel saw frame.

4. An improved dust collection system for use with a panel saw according to claim 1, wherein said panel saw frame is further adapted with vacuum hose guide is mounted to the top of the panel saw frame to allow a dust collection vacuum hose to travel over the frame in trailing relation with the carriage carrying the rotary power saw.

5. A panel saw of the type having a generally vertically disposed frame and a power saw with rotary blade mounted on a carriage movably attached to the frame for travel in a generally vertical direction for cutting sheets of plywood, with the workpiece disposed with a workpiece front side facing away from the panel saw frame and a rear side facing toward the panel saw frame is adapted with an improved dust collection system comprising:
- a blade shroud attached to a top side of said carriage in covering relation with at least a portion of said rotary blade, said shroud having an angled top portion configured to deflect and direct sawdust and wood chips toward an outlet;
- a skirt attached to an underside of said power saw carriage in at least partial surrounding relation with the projecting rotary saw blade and projecting from the power saw carriage so as to be in sweeping contact with the panel workpiece, said skirt thereby defining a sawdust containment volume between the workpiece and said underside of said rotary saw power carriage;
- a sawdust-containing channel member connected to the panel saw frame and disposed in vertical aligned relation with rotary saw blade for containing sawdust behind the workpiece;
- a sawdust collection cup disposed proximal the bottom of said sawdust-containing channel member, said sawdust collection cup having an open top and including a rear portion for receiving sawdust ejected into said channel member and a front portion for receiving sawdust ejected in front of the workpiece, said collection cup defining an outlet; and
- a vacuum dust collection system having a hose connected to said blade shroud outlet and said collection cup outlet.

6. A panel saw according to claim 5, further including at least one bumper disposed between said carriage and an uppermost stop of said frame for cushioning impact.

7. A panel saw according to claim 5, further including a stand upon which said panel saw is mounted said stand including a laterally projecting rigid members for mounting of a dust collection component.

8. A panel saw according to claim 5, wherein said sawdust collection cup is generally T-shaped.

* * * * *